United States Patent [19]
Ellyin

[11] Patent Number: 5,972,141
[45] Date of Patent: Oct. 26, 1999

[54] CARBON FIBER-REINFORCED POLYMER PATCH FOR DEFECT REPAIR OF A STRUCTURAL STEEL COMPONENT

[76] Inventor: Fernand Ellyin, 205, 11660-79 Avenue, Edmonton, Alberta, Canada, T6G 0P7

[21] Appl. No.: 08/813,975

[22] Filed: Jan. 14, 1997

[30] Foreign Application Priority Data

Jul. 18, 1996 [CA] Canada .................................... 2181497

[51] Int. Cl.⁶ .................................................... B32B 35/00
[52] U.S. Cl. ........................... 156/94; 29/402.09; 52/514; 156/71; 428/63
[58] Field of Search ................................. 428/63; 52/514; 156/94, 98, 71; 29/402.09, 402.11

[56] References Cited

U.S. PATENT DOCUMENTS

| | | | |
|---|---|---|---|
| 4,913,758 | 4/1990 | Koster | 156/294 |
| 5,617,685 | 4/1997 | Meier | 52/745.19 |
| 5,738,741 | 4/1998 | Crasto | 156/94 |

OTHER PUBLICATIONS

AN 92: 374844, "What's New in Japan in Advanced Carbon Fiber Composites for Civil Engineering at Tonen?", Composites Industry Monthly (Jun. 1992).

*Primary Examiner*—Daniel Stemmer
*Attorney, Agent, or Firm*—Sheridan Ross P.C.

[57] ABSTRACT

A process for patching a crack or other defect in a thick-walled steel component, such as the wall of a pressure vessel, is provided. Stacked sheets of pre-impregnated carbon fiber-reinforced epoxy are bonded together and cured by interposed layers of a second resin. A structural adhesive is used to bond the stack to the steel to form the patch.

16 Claims, 7 Drawing Sheets

FIG. 10
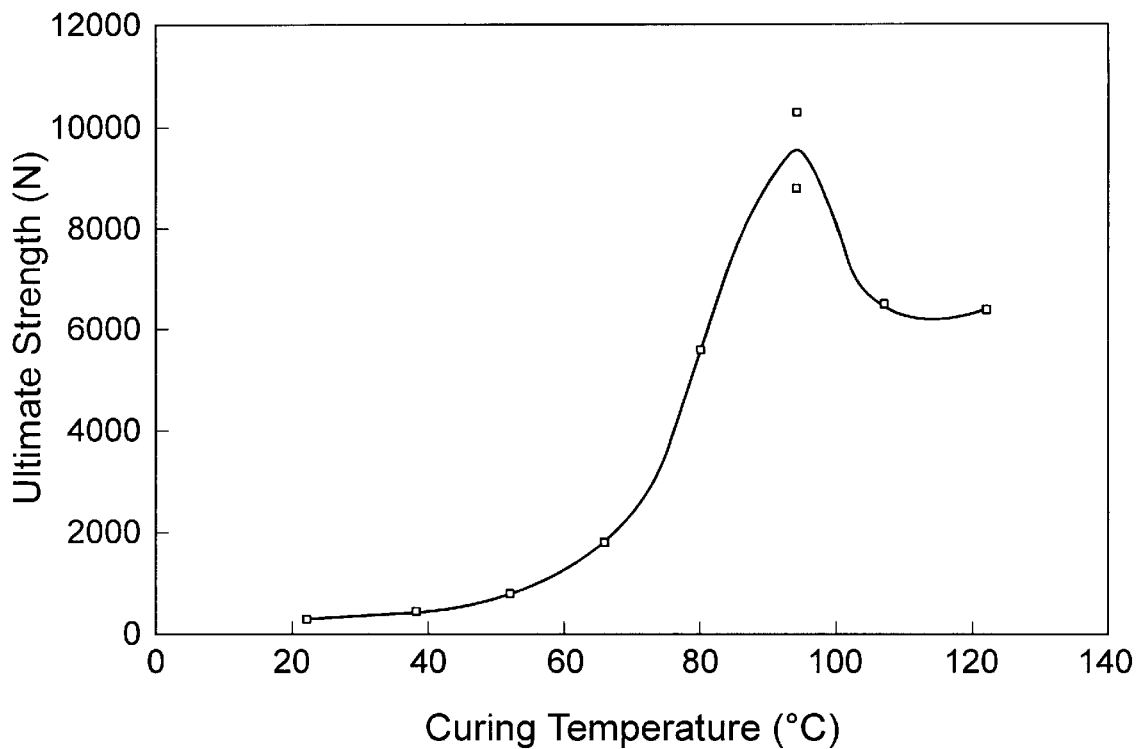
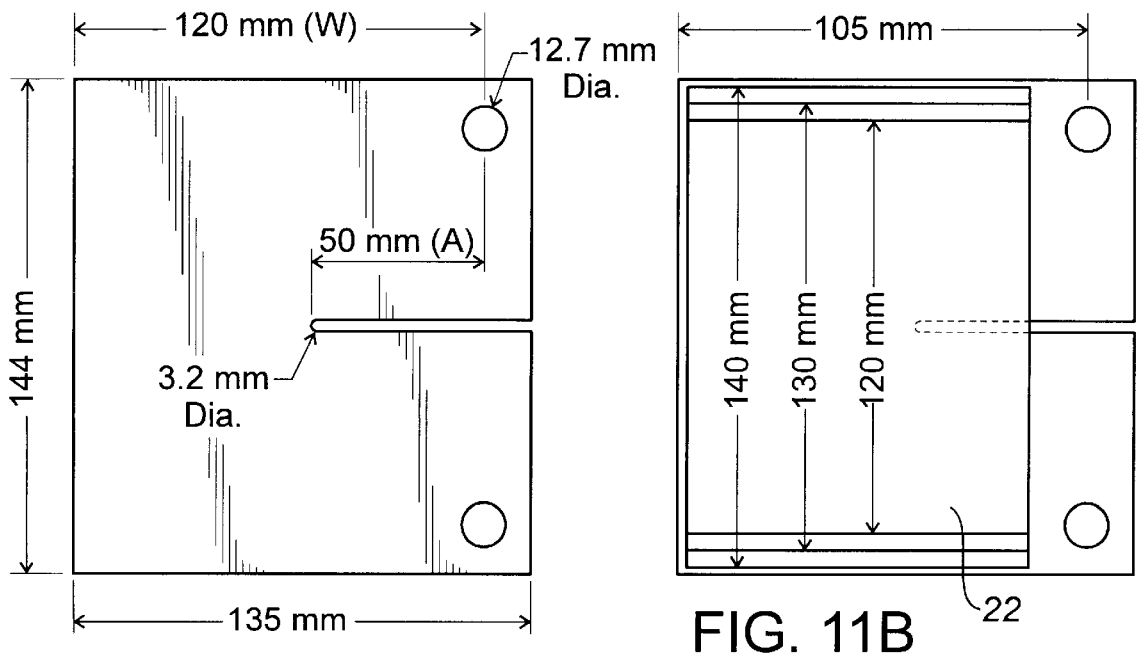
FIG. 11A
FIG. 11B

CARBON FIBER-REINFORCED POLYMER PATCH FOR DEFECT REPAIR OF A STRUCTURAL STEEL COMPONENT

FIELD OF INVENTION

In one aspect, the invention relates to a process for preparing and applying a cohesive, laminated carbon fiber-reinforced polymer patch to a structural steel component having a corrosion or crack defect, to repair the defect and produce a strengthened composite component. In another aspect, the invention relates to a repaired component having such a patch over the defect.

BACKGROUND OF THE INVENTION

It is common to have stress fatigue cracks or corrosion damage (collectively referred to herein as "defects") in structural steel components, such as the body of a beam or the wall of a pressure vessel. These defects often eventually require repair.

The conventional technique used involves removing defected metal and replacing it with a compatible alloy through a welding process. The welding can cause undesirable embrittlement, distortion and the imposition of residual stresses, which can lead to further failure.

The research underlying the present invention was undertaken with the aim of devising an alternative technique for repairing such defects, particularly in thick walled steel components.

The research centered on experimenting with carbon fiber-reinforced polymer sheets to form a patch over the defect. More particularly, the commercial product used in the experimentation was one offered by Mitsubishi Chemical Corporation, of Japan, under the trade mark REPEL-ARK.

This technology involves the use of thin, flat, substantially rigid sheets of partly cured epoxy resin having parallel carbon fibers embedded therein and oriented along the length of the sheet. These sheets are referred to in the art by the term "pre-pregs", which is a short-hand term for "pre-impregnated carbon fiber reinforced resin sheet". A liquid epoxy resin (referred to herein as "the curing resin") is used to initiate curing of the resin of the pre-preg and to bond it to the substrate to which it is to be attached. Curing and bonding occur over time when the two resins are brought into contact. Otherwise stated, the Mitsubishi system is characterized by the use of compatible resins which interact chemically at atmospheric temperature to effect complete curing of the pre-preg resin and bonding of the curing resin with the pre-preg resin and the substrate.

This contrasts with other known systems in which carbon fiber-reinforced epoxy sheets are cured using a combination of high temperature (e.g 350° F.) and pressure.

The Mitsubishi system lends itself to use in the field, where it is impractical to use high temperature and pressure-inducing equipment.

In practice, it has been used to clad and reinforce concrete structures, such as bridge beams. In this application, a skin, comprising a single thickness of contiguous pre-pregs, is bonded to the flat concrete surfaces of the beam by a layer of curing resin. The pre-preg resin slowly cures at ambient temperature to a completely hardened state, over a period of about a week, by interaction with the curing resin.

Applicant speculated that the Mitsubishi or a similar pre-preg system might be useful in connection with patching defects in a structural steel component, such as the boom of a crane or the wall of a pressure vessel. However, on carrying out experimentation and obtaining familiarity with the Mitsubishi system, several problems became evident and required solution. More particularly:

The interface strength contributed by the layer of curing resin, when cured at ambient temperature, was very low—in tests, failure would occur in this layer at about 200 N, whereas a failure characteristic in the order of perhaps 10,000 N was needed;

A patch having a thickness of just one pre-preg had insufficient strength in the context of thick-walled steel structures—but using a stack of several pre-pregs required the use of several curing resin layers, which introduced further weakness;

The time required to cure at the conventional ambient temperature in field applications to a fully cured state, (typically a week), was impractical for use with a component that needed to go back into service as soon as possible, fully repaired; and It was a requirement in many cases that the patch had to conform to a substrate surface that was something other than a flat surface. For example, the surface might be arcuate or irregular (as would occur where a crack extended from a bulging weld).

SUMMARY OF THE INVENTION

Through on-going experimentation, Applicant gradually evolved a process based on the following:

It was found that mild heating of the pre-preg/curing resin assembly resulted not only in accelerated curing but also in sufficient strengthening of the layer of curing resin so that the latter was no longer a weak point in the end product;

It was further found that use of heat-shrinkable tape was effective to uniformly contain and apply pressure to such an assembly, when mildly heated;

It was found that the provision of wrap-around heating pads and heat-shrinkable tape provided suitable means for applying sufficient pressure and heat to a partly cured pre-preg/curing resin assembly mounted on a steel component in the field to achieve satisfactory bonding and curing within a period in the order of 2 hours;

As a result of the foregoing, it was now possible to use a stack of pre-pregs (perhaps three or more), separated by layers of curing resin, to create an assembly suitable for heat and pressure treatment to produce an end product having the necessary patch strength;

The stack could be satisfactorily contained by a combination of release film and peel-ply fabric (referred to singly or collectively as "release means") at the top and bottom;

To cope with forming problems and to minimize time consumption in the field, advantage was taken of the fact that, in the early stages of curing, the resin of the pre-preg softens and the pre-preg/curing resin assembly can be formed. As curing continues over time, the softened resins harden and begin to rigidify. Therefore, the process preferably incorporates first forming the pre-preg/curing resin laminate stack, including release means, on a prepared form or mould, under controlled conditions at a site removed from the component and then, after about 3 days of curing, conveying the formed, partly cured and shape-retaining laminate stack to the component, mounting it thereon, and rapidly completing curing using mild heat and pressure as previously described;

It was further found desirable to abrade or roughen and clean the surface of the component and to texture the bottom of the stack, after removal of the release means, to ensure good bonding; and Finally it was found desirable to use a high strength structural adhesive to unite the base of the stack with the surface of the steel component. The bond strength of this layer is the most important parameter in transferring load from the steel substrate to the patch.

As a result of combining all of these features, the following were realized:

The patch/component composite structure had a greater failure strength than the original unreinforced component;

The final steps of applying, bonding and completely curing the stack on the component could be accomplished in about 2 hours; and Additional crack initiation or growth was effectively arrested.

The invention is further characterized by the following additional advantages: the patch does not introduce significant stress concentrations or alter the quality of the steel; the patch can be easily manufactured to match the contour of the component's surface; and the patch is thin and therefore does not alter the geometry of the component significantly.

Broadly stated, in one aspect the invention comprises, in combination, a steel structural component having a surface; and a substantially cured, cohesive, laminated patch comprising a stack of at least two pre-impregnated carbon fibre-reinforced resin sheets bonded together by an interlaminar layer of a curing resin, the resin sheet and curing resin being chemically interactive to cause curing of the resin of the sheet, the stack being bonded to the steel surface with a structural adhesive, the end assembly of stack, structural adhesive and component having been subjected to the application of pressure and temperature to create a patch/component composite structure having greater strength than the component. In a preferred embodiment the component has a defect and the patch is bonded to the steel surface over the defect.

Broadly stated, in another aspect the invention comprises a process for providing a patch on a steel structural component having a defect, shape and a surface, comprising: providing a stack of at least two pre-impregnated, carbon fiber-reinforced resin sheets separated by an interlaminar layer formed of a different resin, said resins being chemically interactive at room temperature to cause curing of both resins, said stack having top and bottom surfaces contained by release means; retaining the stack together for sufficient time so that partial curing occurs, said retention being conducted at a location away from the component; conveying the stack to the component and removing the bottom release means; interposing a layer of structural adhesive between the component surface and the bottom layer of the stack and mounting the stack to the component over the defect; and accelerating curing and strengthening of the interlaminar layer by heating the total patch and pressing it to the component to produce a composite structure.

In a preferred form of the invention, when there is a multi-axial state of stress in the component, then the fiber orientation and the ply sequence are arranged in such a way that some fibers' orientation substantially coincide with dominant principal stress directions.

DESCRIPTION OF THE DRAWINGS

FIG. 1 is a perspective schematic view representing the step of cutting and stacking the carbon-fiber pre-impregnated sheets ("pre-pregs") of the laminate;

FIG. 2 is a side schematic view representing the step of preparing the epoxy resin used to cure and bond the sheets;

FIG. 3 is a perspective schematic view showing the stack of pre-pregs separated by an interlaminar layer of epoxy resin;

FIG. 4 is a side sectional view representing the step of applying peel-ply fabric and release film to the top and bottom of the stack of FIG. 3;

FIG. 5 is a side sectional view representing the step of shaping the partly cured stack of FIG. 4 on a mould;

FIG. 6 is a side sectional view representing the step of bonding the stack to the crack-containing substrate to be repaired by applying pressure and heat, with a layer of structural adhesive in place between the stack and substrate and the peel-ply fabric and release film having been previously removed; and FIG. 7 is a side sectional view of the finished product showing the pre-pregs bonded to each other and to the substrate in the form of a patch;

FIG. 10 is a plot of ultimate strength versus curing temperature, showing the effect of cure temperature on the composite's inter-laminar shear strength;

FIGS. 11A and 11B are plan views showing dimensioned unpatched and patched specimens ready for testing for crack initiation;

DESCRIPTION OF THE PREFERRED EMBODIMENT

The best mode procedure practised is now described. The procedure is schematically illustrated in FIGS. 1–7.

The procedure involves four distinct stages. (1) Design and preparation of a carbon fiber reinforced patch; (2) Surface preparation of the metallic component; (3) Bonding of the patch to the metallic structural component; (4) Curing of the patch ensemble. Each phase involves a number of steps as follows:

1. Design and Preparation of the Carbon Fiber Patch
1.1 Design

The size, lay-up (orientation of fibers) and number of layers are determined according to the applied stress field, the area to be repaired and the nature of the defect, e.g. crack or corrosion pit.

Figure 1:
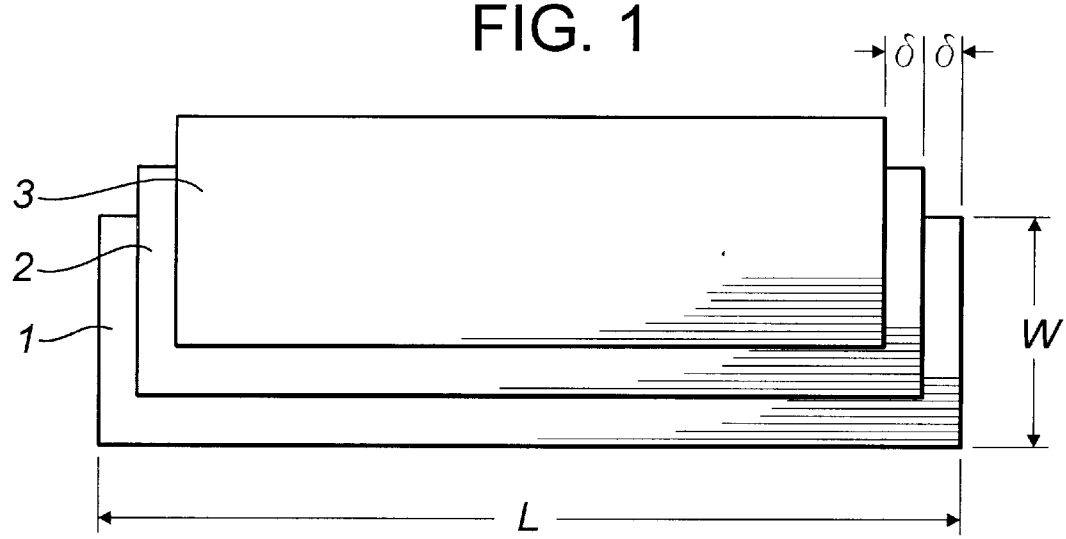
FIGS. 1–7 are a series of schematic illustrations representing the steps of the process. More particularly.

1.2 Cutting Carbon Fiber Pre-impregnated Sheets (see FIG. 1)

Recommended Procedure:
1.2.1 Provide REPLARK brand pre-impregnated carbon fibre sheets 1, 2, 3, from refrigerated storage.
1.2.2 Cut the sheets 1, 2, 3 to the dimensions determined in step 1.1.
1.2.3 Allow the cut carbon fiber sheet to reach room temperature before forming a laminate. Do not expose the sheet to room temperature for a long period.

Figure 2:
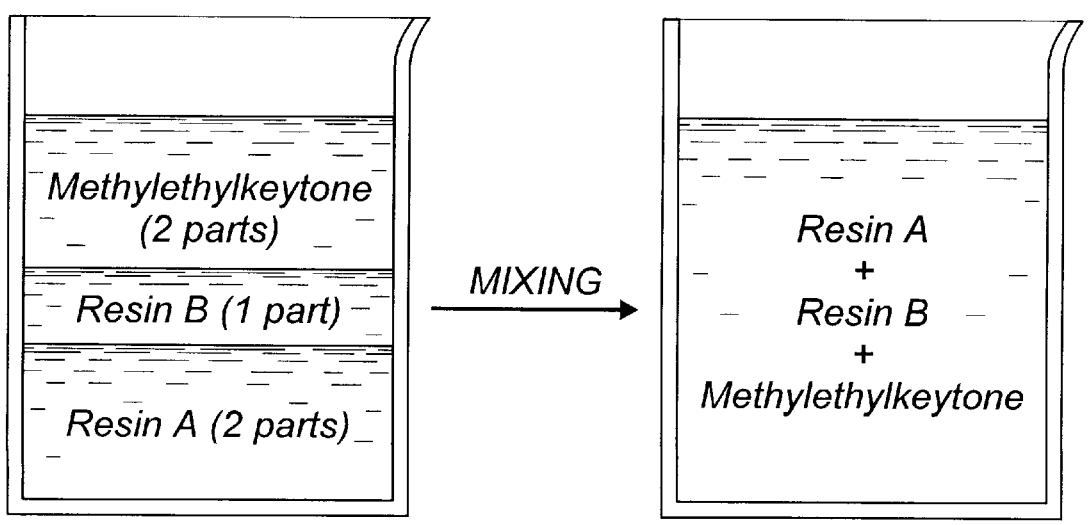

1.3 Preparation of the curing resin (see FIG. 2)

Recommended ingredients:
(a) epoxy resin, Part A and B (Mitsubishi Chemical Corporation product);
(b) methlyethylkeyton (MEK), thinner.

Procedure:
1.3.1 Weigh out 2 parts by weight epoxy resin (Part A) into a glass beaker.
1.3.2 Add 1 part by weight of epoxy curing agent (Part B).
1.3.3 Add 2 parts by weight of methylethylkeyton to dilute epoxy resin.
1.3.4 Mix thoroughly using a steel spatula (approx. 10 minutes).
1.3.5 After mixing hold for 30 minutes.

Figure 3:
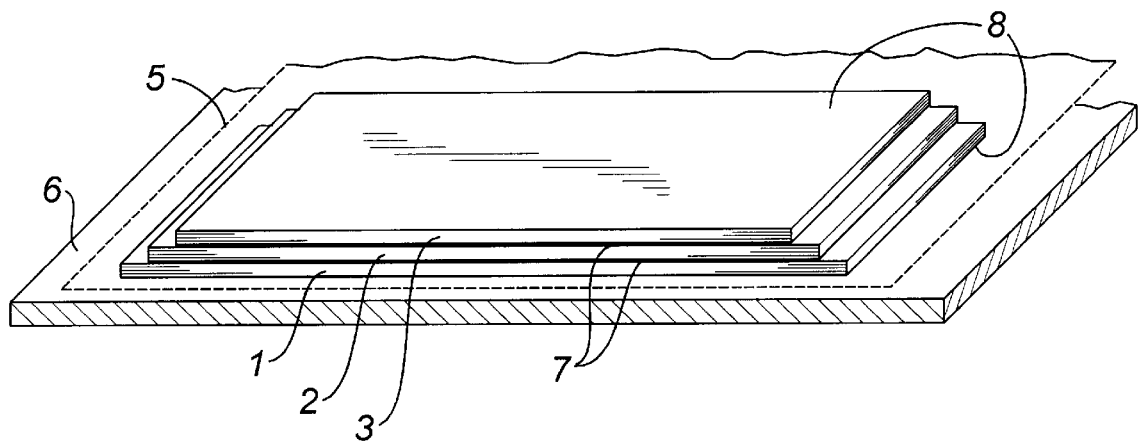
Figure 4:
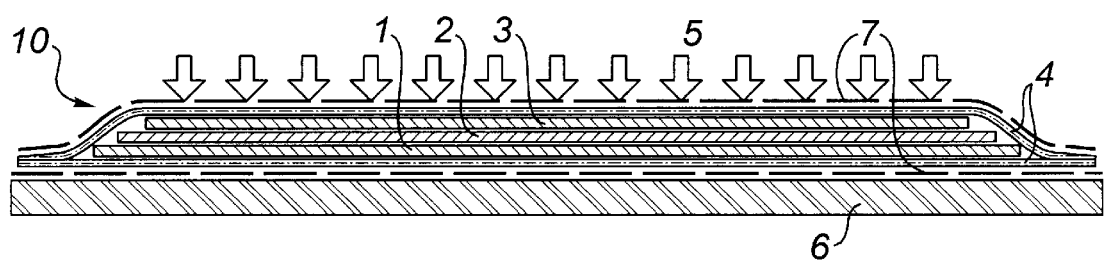
Figure 5:
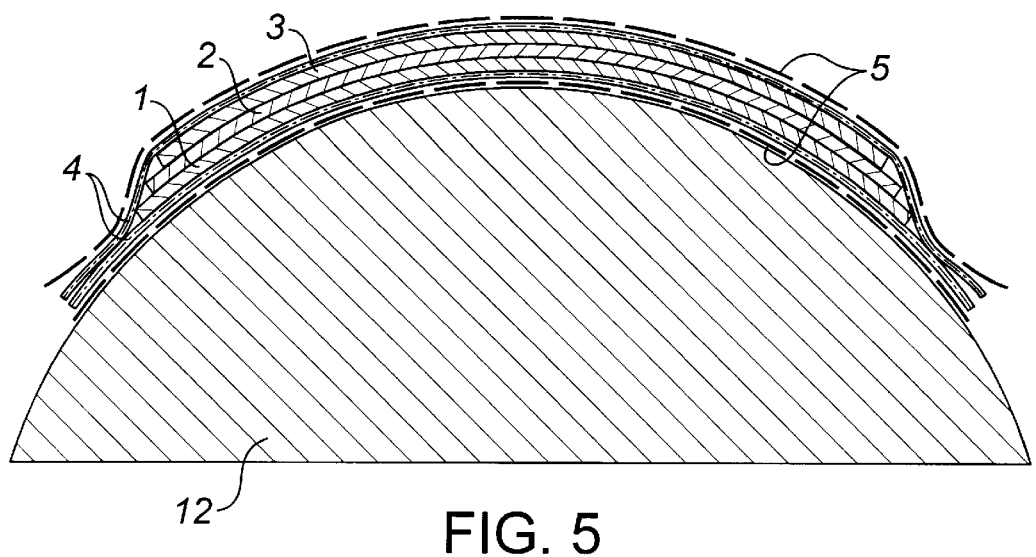
Figure 6:
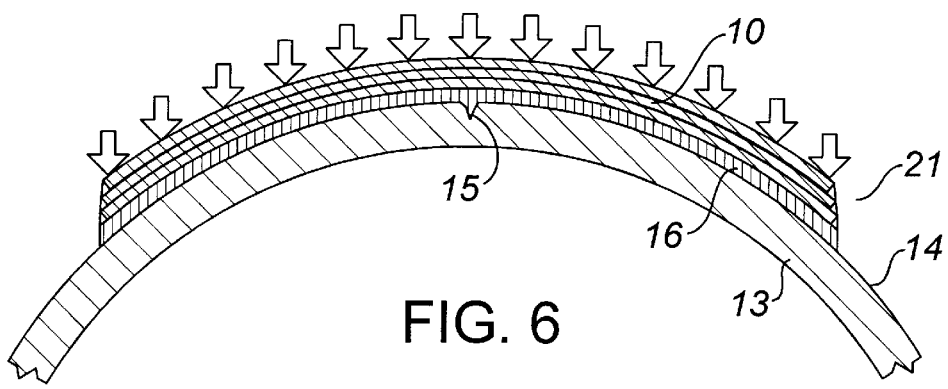
Figure 7:
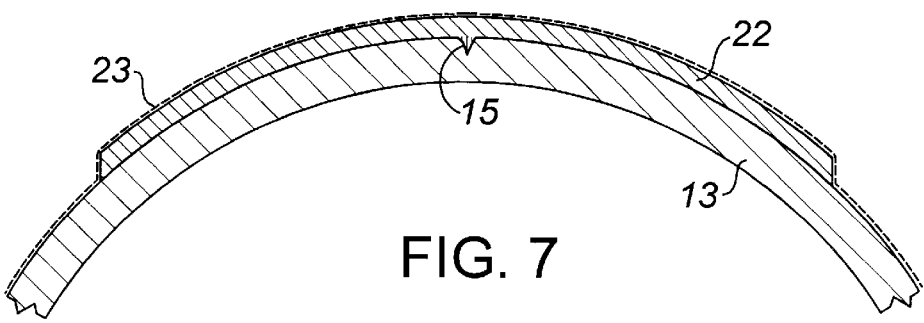

1.4 Lay-up of the Carbon Composite Stack (see FIG. 3)

Recommended materials:
(a) provide nylon release peel ply fabric 4 and release film 5 (0.002" thick E4760 non-perforated) available from Northern Fibre Glass Sales, Inc., Alberta;
(b) a flat plate 6.

Procedure:
1.4.1 Place the plate 6 in a well ventilated area.
1.4.2 Cover the plate 6 with a layer of release film 5.
1.4.3 Place a carbon fiber sheet 1 on the release film 5 with paper backing 8 downwards.
1.4.4 Coat the carbon fiber sheet 1 with epoxy resin 7 (prepared in step 1.3).
1.4.5 Press a second sheet 2 of carbon fiber (paper backing 8 upwards) onto the first with hand pressure and press by roller to release air.
1.4.6 Remove the paper backing of the second carbon fiber sheet 2.
1.4.7 Coat the carbon fiber sheet 2 with epoxy resin 7.
1.4.8 Repeat the steps 1.4.5–1.4.7 until the desired final patch thickness has been reached.
1.4.9 Apply a layer of the nylon release peel ply fabric 4 to the top surface.
1.4.10 Turn stack 10 over and remove the paper backing 8 off the first layer or sheet 1.
1.4.11 Coat this first carbon fiber sheet 1 with epoxy resin 7.
1.4.12 Apply a layer of the nylon release peel ply fabric 4.
1.4.13 Cover the stack 10 with another layer of release film 5.
1.4.14 If the surface of the structural component 11 to be repaired is not flat, then after 24 hours the stack is shaped by using an appropriate mould 12 (see FIG. 5) and is held in place for 1–2 days.

2. Surface Preparation of the Steel Component or Substrate 13

2.1 Procedure
2.1.1 If the substrate surface 14 has abrupt discontinuities, then use a grinder to smoothen the surface.
2.1.2 If the surface 14 contains a crack 15 or cracks, then drill a small hole ($\phi$=2–4 mm) at each end of the crack.
2.1.3 Enlarge the crack into a v-shape so that it can retain a viscose adhesive.
2.1.4 Sandblast the area to remove rust/scale and to obtain a clean surface.

3. Bonding of the Stack 10 to the Metal Surface 14 (see FIG. 6)

Recommended materials:
(a) release film 5 (E4760 Non-perforated);
(b) a structural 3M DP-460 Epoxy Adhesive with applicator;
(c) acetone;
(d) shrink tape (Oriented Polyester Tape);
(e) high temperature blue polyester tape.

3.1 Procedure
3.1.1 Clean the sandblasted surface 14 with acetone and let it dry.
3.1.2 Apply a thin layer 16 of 3M DP-460 adhesive to the cleaned surface and if present, fill the crack(s) 15 with the same adhesive.
3.1.3 Remove the bottom nylon peel ply fabric 4 from the laminate 10 to expose the bonding bottom surface.
3.1.4 Press the stack 10 onto the metal's bonding surface 14, to produce a laminate on the component.
3.1.5 Cover the laminate/component ensemble 21 (referred to in the claims as an "end assembly") with a layer of release film.
3.1.6 Use the shrink tape (not shown) to wrap over the ensemble. Affix two ends of the shrink tape by using the high temperature blue polyester tape.

4. Curing of the Ensemble 21 (see FIG. 7)

Equipment:
(a) thermocouples;
(b) heating pads;
(c) UV protective coating.

4.1 Procedure
4.1.1 Apply the heating pads to the ensemble 21, increase the temperature to 200° F. and maintain it for 2 hours.
4.1.2 After 2 hours remove heating pads, thermocouples, shrink tape and release film.
4.1.3 Protect the free surface of the patch 22 with a coating 23 of suitable material (UF protective).

The Composite Laminate's Microstructure

Figure 8:
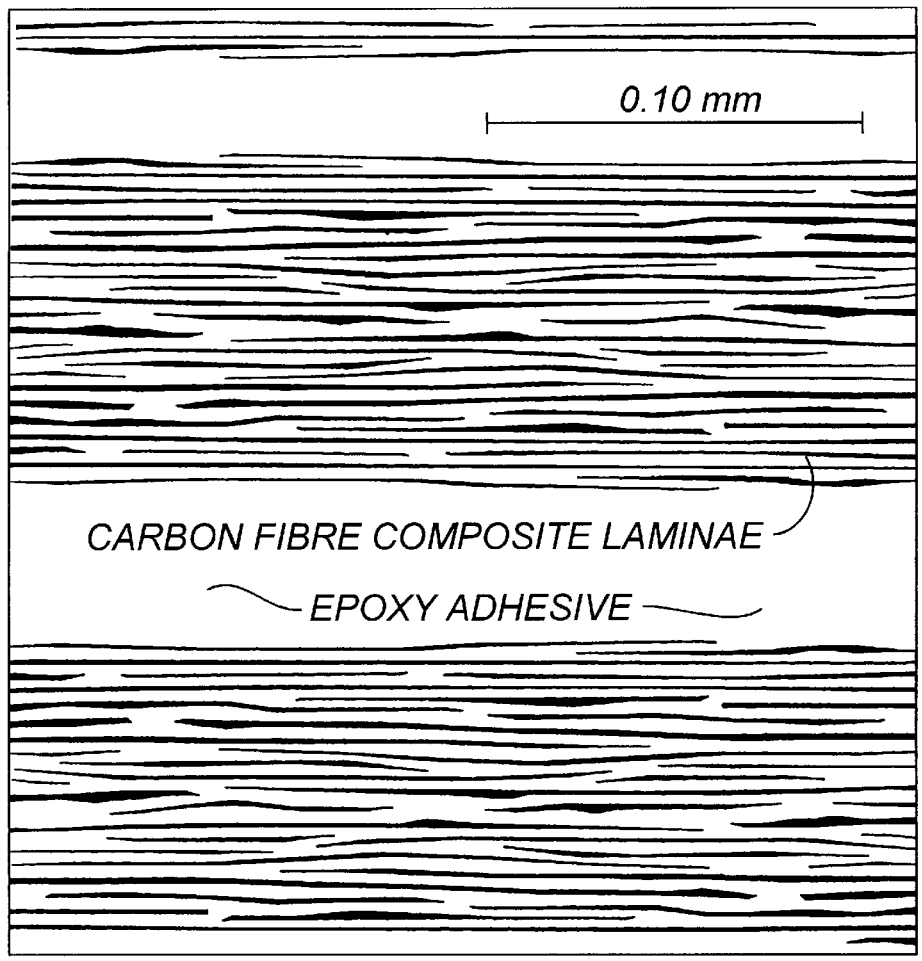
FIG. 8 is a fanciful representation of a microscopic view of the carbon fiber composite laminate showing alternating layers of carbon fiber-reinforced epoxy and un-reinforced epoxy.

The pre-impregnated composite sheets used in this procedure consisted of long unidirectional carbon fibers embedded in a room-temperature cure epoxy. The fabrication of the patch began by applying a two-part epoxy resin to a pre-impregnated sheet and pressing another sheet over the first one. Subsequent layering of the two-part epoxy and carbon fiber pre-impregnated sheet was repeated until the carbon fiber stack was built-up to the required thickness. FIG. 8 shows a microscopic view of the two layers of the carbon fiber pre-impregnated sheet bonded together with a layer of the epoxy resin.

A microscopic examination of the composite of FIG. 8 illustrates an inherent structural weakness. Because of the aforementioned lay-up procedure, the laminate has a layer of epoxy with no carbon reinforcement. This then limits its application to patching on metallic structures because of low interlaminar shear strength. Through extensive experimental investigation, we have increased the shear strength of the unreinforced interlaminar epoxy layer. This is demonstrated in the following examples.

EXAMPLE #1

Figure 9A:
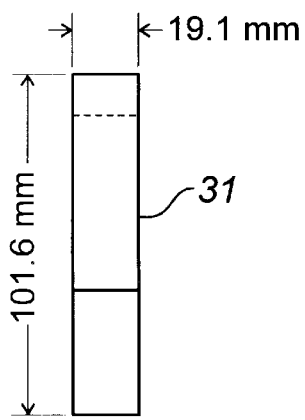
FIG. 9A is a side view of a dimensioned steel tab used in failure tests of bonded pre-pregs.
Figure 9B:
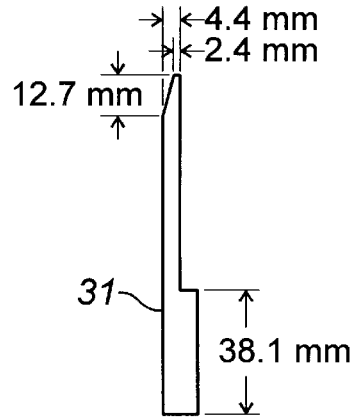
FIG. 9B is an end view of the steel tab or testing coupon shown in FIG. 9A.
Figure 9C:
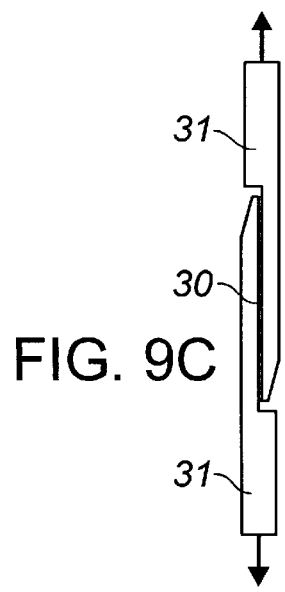
FIG. 9C is an end view showing two unidirectional carbon fibre strips bonded between two steel tabs prior to testing to determine interlaminar shear strength.

In this example we demonstrate how the interlaminar shear strength of the composite laminate is substantially increased compared to that obtained following the pre-impregnated sheet manufacturer's recommended procedure. FIGS. 9A–9C show the experimental test set-up used to investigate the interlaminar shear strength of the composite laminate. Laminates of two unidirectional carbon fibre strips 30 (50.8 mm×12.7 mm) were bonded in accordance with the aforedescribed procedure but at various curing temperatures. The laminates were bonded between two steel tabs 31 and pulled to failure.

The failure loads were plotted as a function of the maximum applied curing temperature in FIG. 10. It is seen that the strongest composite laminate was obtained when the specimen was cured at 93° C. (200° F.) for 2 hours. This is an increase at over 50 times when compared to room temperature (22° C.) curing for 7 days in accordance with the manufacturer's recommended procedure.

EXAMPLE #2

Cracks generally initiate from notches which are stress magnification sites. In this example we demonstrate that the crack initiation period is considerably extended when a carbon fiber-reinforced patch is applied over the notch. FIG. 11(a) shows a standard ASTM (American Society for Testing Materials) compact tension (CT) specimen with a notch diameter of 3.2 mm. All other dimensions are given in the figure. Five different CT initiation specimens were investigated: one un-patched, four others patched as shown in Table 1. In this Table, HS refers to a high strength carbon fiber. The loading history for each specimen is given in the Table. The un-patched specimen was loaded in tension-tension with a tensile mean load at 8.9 KN (2,000 lbs.) and a superimposed cyclic load of ±8.1 KN (±1820 lbs.). A crack initiated in the un-patched specimen after 2,150,000 cycles. No cracks initiated in the patched specimens loaded at the same load level as the unpatched specimen. The load was subsequently increased by intervals of 5% until a crack was initiated, see Table 1.

TABLE 1

|  | Mean Load | Dynamic Load | Cycles to Initiation |
|---|---|---|---|
| Unpatched | 8.9 kN | ±8.1 kN | 2,150,000 |
| 3 layers-LS | 8.9 kN | ±8.1 kN | 10,000,000 + |
|  | 9.5 kN | ±8.6 kN | 10,000,000 + |
|  | 10.0 kN | ±9.0 kN | 2,000,000 |
| 3 layers-LS | 8.9 kN | ±8.1 kN | 10,000,000 + |
|  | 9.5 kN | ±8.6 kN | 10,000,000 + |
|  | 10.0 kN | ±9.0 kN | 10,000,000 + |
|  | 10.5 kN | ±9.5 kN | 2,000,000 |
| 6 layers-HS | 8.9 kN | ±8.1 kN | 10,000,000 + |
|  | 9.5 kN | ±8.6 kN | 10,000,000 + |
|  | 10.0 kN | ±9.0 kN | 10,000,000 + |
|  | 10.0 kN | ±9.5 kN | 10,000,000 + |
|  | 11.0 kN | ±9.9 kN | 160,000 |
| 3 layers-HS | 8.9 kN | ±8.1 kN | 10,000,000 + |
|  | 9.5 kN | ±8.6 kN | 10,000,000 + |
|  | 10.0 kN | ±9.0 kN | 7,000,000 |

EXAMPLE #3

In this example we show that when the carbon fiber-reinforced patch is applied on a cracked structure, the crack growth is arrested.

Figure 12A:
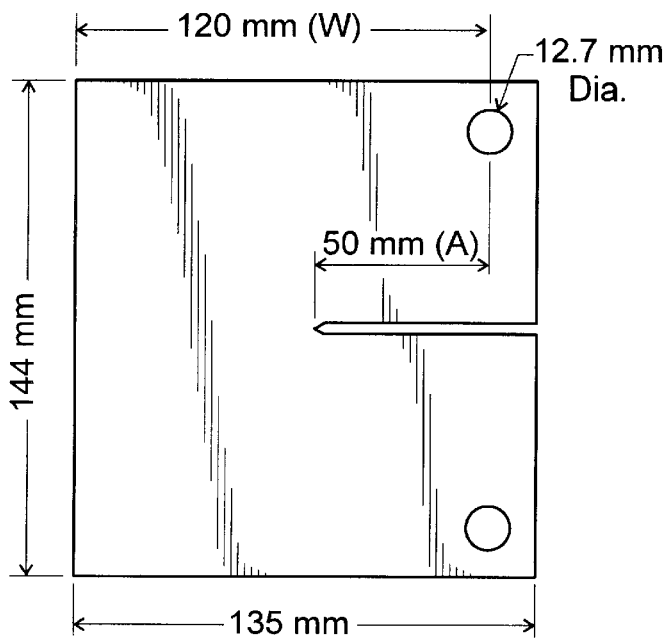
FIGS. 12A and 12B are plan views showing unpatched and patched specimens ready for testing for crack propagation.
Figure 12B:
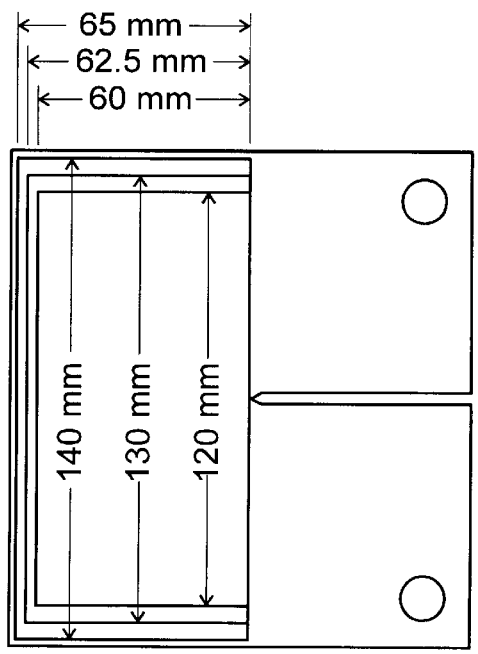
Figure 13:
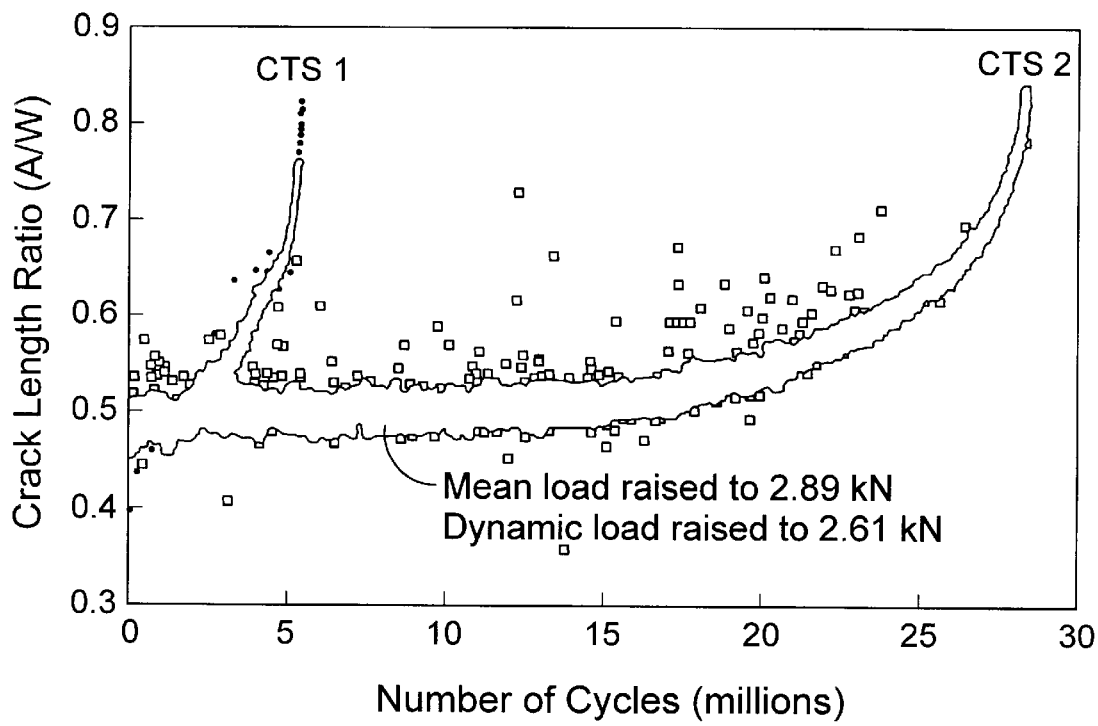
FIG. 13 is a plot showing the relationship of crack propagation to cyclic loading with respect to the unpatched and patched specimens of FIGS. 12A and 12B.

FIG. 12(a) shows a standard ASTM CT specimen with a sharp notch. A crack was initiated in the specimen and crack propagation under a cyclic load of ±2.38 kN (±535 lbs.) with a mean tensile load of 2.63 kN (590 lbs.) was monitored. FIG. 13 shows the crack length as a function of the applied cycles for the unpatched specimen indicated by CTSI. No crack growth occurred when the initiated crack was patched with the carbon fiber-reinforced patch, as shown in FIG. 12(b) specimen CTS2. After $10\times10^6$ cycles, the applied load was increased by 10% and upon further cycling the crack in the patched specimen began to propagate (see FIG. 13).

EXAMPLE #4

In this example we show the effect of surface preparation at both the carbon fiber-reinforced patch and the steel, on the bond strength.

Figure 14:
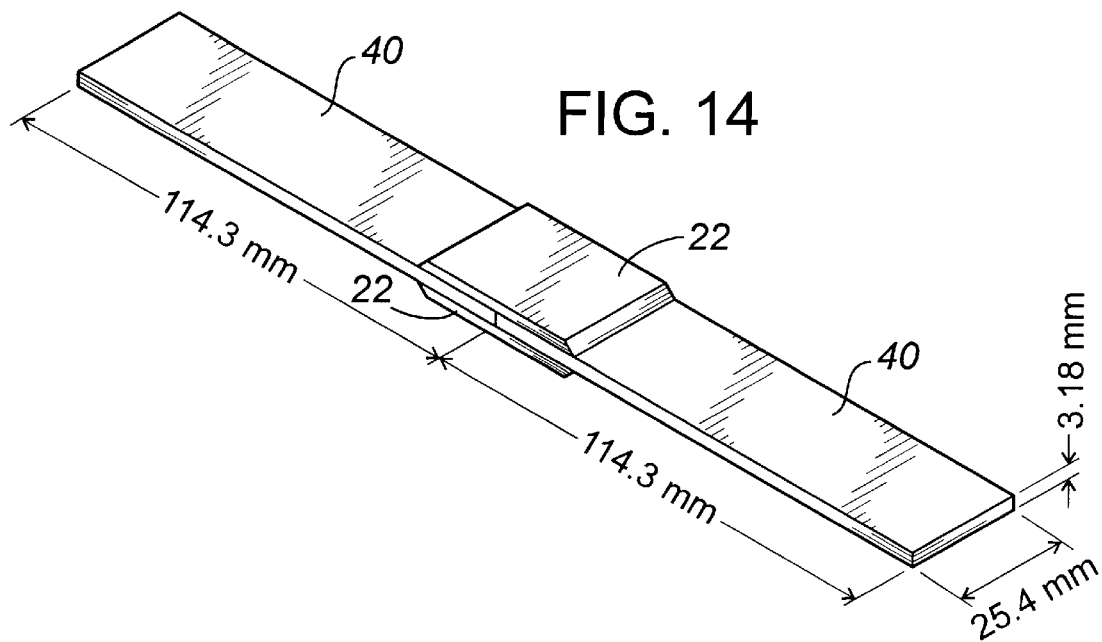
FIG. 14 is a perspective view showing the dimensioned double lap shear specimen tested for Example 4.
Figure 15:
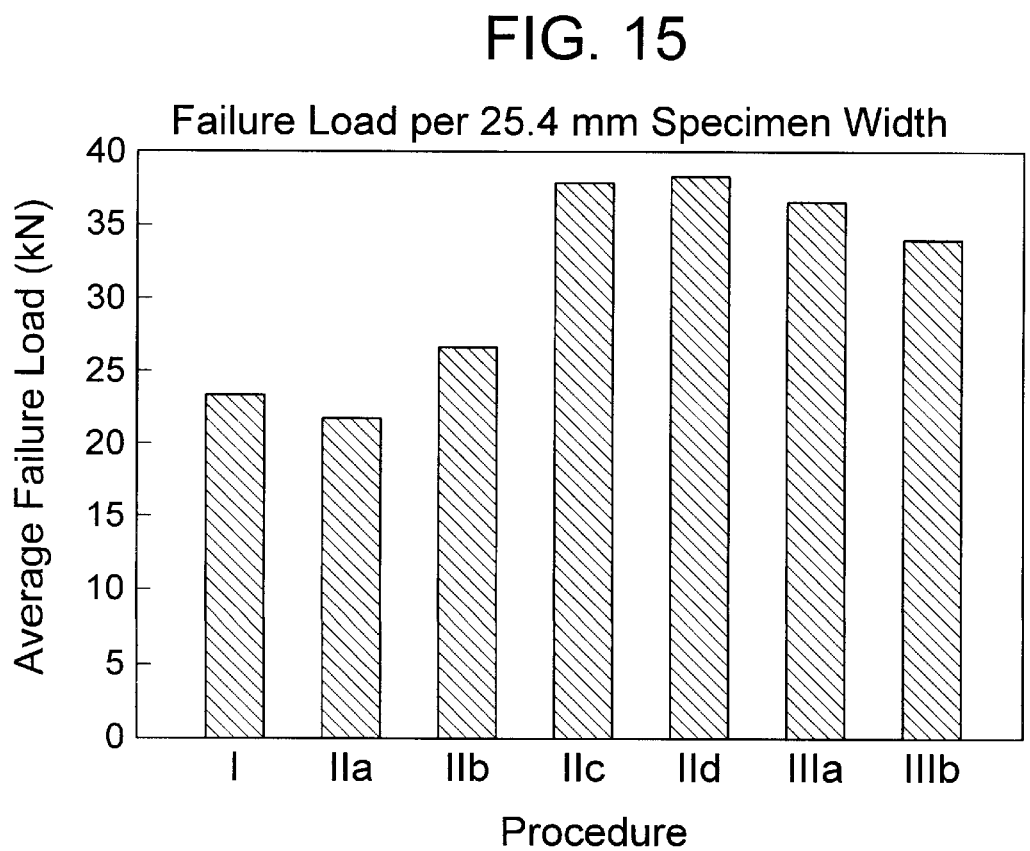
FIG. 15 is a histogram showing average strength for seven different surface preparations.

A double lap shear specimen 40 (ASTM A-516 Gr 70 pressure vessel steel) as shown in FIG. 14 was employed to investigate the shear strength of the adhesive layer in a tapered UD carbon fibre composite patch 22. All specimens were cured in the same manner, i.e. 3 days at room temperature and 2 hours at 93° C. (200° F.). FIG. 15 shows a histogram of average strength for 7 different surface preparations. In specimens denoted by 1 and 11a, Mitsubishi two-part epoxy adhesive was used to bond the patch to the specimen surface. In all others a structural adhesive was employed for the bonding. It is seen that the present procedure 11d advocated provides an increased bond strength of more than 64% when compared to the procedure 11a.

What is claimed is:

1. In combination:
    a steel structural component having a surface; and
    a substantially cured, cohesive, laminated patch comprising a stack of at least two pre-impregnated carbon fibre-reinforced resin sheets bonded together by an interlaminar layer of a curing resin, the resin sheet and curing resin being chemically interactive at room temperature to cause curing of the resin of the sheet, the stack being bonded to the steel surface with a structural adhesive, the end assembly of stack, structural adhesive and component having been subjected to the application of pressure and temperature to create a patch/component composite structure having greater strength than the component.

2. The combination as set forth in claim 1 wherein:
    the component has a defect; and
    the patch is positioned over the defect.

3. The combination as set forth in claim 2 wherein:
    the steel structural component is thick-walled, having a wall thickness greater than the thickness of the patch.

4. The combination as set forth in claim 3 wherein:
    the structural component has a multi-axial stress field;
    each sheet has its carbon fibers aligned in one direction; and
    the orientation of the fibers of at least two sheets in the stack are different and arranged so that the fiber orientations substantially coincide with dominant principal stress directions.

5. The combination as set forth in claim 1 wherein:
    the steel structural component is thick-walled, having a wall thickness greater than the thickness of the patch.

6. The combination as set forth in claim 5 wherein:

the structural component has a multi-axial stress field;

each sheet has its carbon fibers aligned in one direction; and the orientation of the fibers of at least two sheets in the stack are different and arranged so that the fiber orientations substantially coincide with dominant principal stress directions.

7. A process for providing a patch on a steel structural component having a shape and a surface, comprising:

providing a stack of at least two pre-impregnated, carbon fiber-reinforced resin sheets separated by an interlaminar layer formed of a different resin, said resins being chemically interactive at room temperature to cause curing of both resins, said stack having top and bottom surfaces contained by release means;

retaining the stack together for sufficient time so that partial curing occurs, said retention being conducted at a location away from the component;

conveying the stack to the component and removing the bottom release means;

interposing a layer of structural adhesive between the component surface and the bottom layer of the stack and mounting the stack to the component; and accelerating curing and strengthening of the resins by heating the total patch and pressing it to the component to produce a composite structure.

8. The process as set forth in claim 7 wherein:

the mounted stack is wrapped in heat-shrinkable tape and heating pads are applied to the wrapped stack to heat the total patch and press it to the component.

9. The process as set forth in claim 7 wherein heating of the total patch is carried out at a temperature less than the melting temperature of the sheet resin.

10. A process for providing a patch on a steel structural component having a shape and a surface, comprising:

providing a stack of at least two pre-impregnated, carbon fiber-reinforced resin sheets separated by an interlaminar layer formed of a different resin, said resins being chemically interactive at room temperature to cause curing of both resins, said stack having top and bottom surfaces contained by release means;

retaining the stack together for sufficient time so that partial curing occurs and the sheet resin softens so that the stack is pliable, said retention being conducted at a location away from the component;

applying the pliable stack to a form having the approximate shape of the component, so that the stack substantially conforms to the component shape and partly hardens so that it will retain its new shape;

conveying the stack to the component;

preparing the surface of the component by abrading and cleaning it;

removing the bottom release means;

interposing a layer of structural adhesive between the component surface and the bottom layer of the stack and mounting the stack to the component;

accelerating curing and strengthening of the resins by heating the total patch and pressing it to the component to produce a composite structure.

11. The process of claim 7, wherein the component has a defect and the stack is mounted to the component over the defect.

12. The process of claim 11, wherein the mounted stack is wrapped in heat-shrinkable tape and heating pads are applied to the wrapped stack to heat the total patch and press it to the component.

13. The process of claim 11, wherein heating of the total patch is carried out at a temperature less than the melting temperature of the sheet resin.

14. The process of claim 10, wherein:

the component has a defect;

the form has the approximate shape of the component at the defect; and the stack is mounted to the component over the defect.

15. The process of claim 14, wherein the mounted stack is wrapped in heat-shrinkable tape and heating pads are applied to the wrapped stack to heat the total patch and press it to the component.

16. The process of claim 14, wherein heating of the total patch is carried out at a temperature less than the melting temperature of the sheet resin.

* * * * *